UNITED STATES PATENT OFFICE.

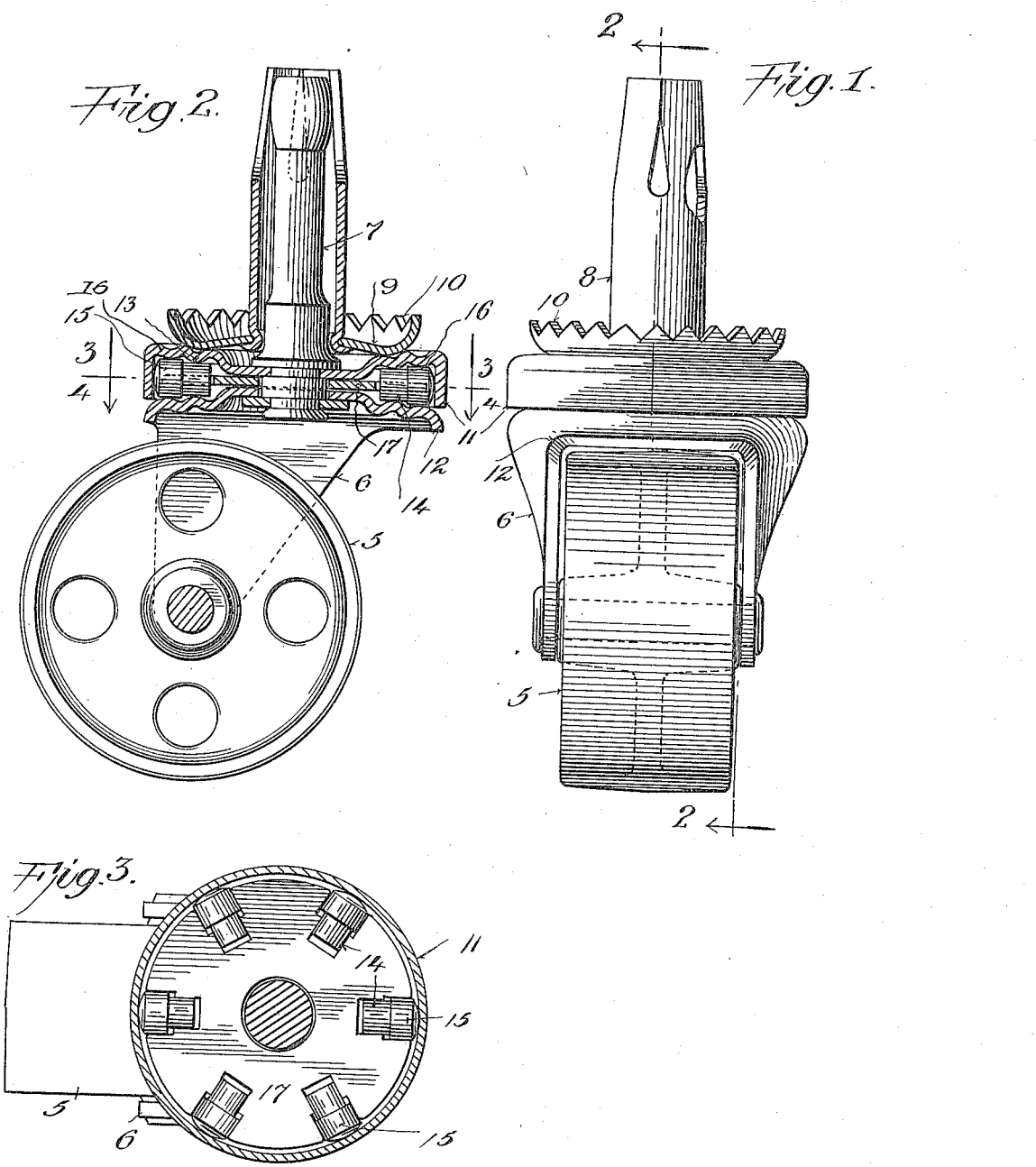

ALBERT B. DISS, OF NEWARK, NEW JERSEY, ASSIGNOR TO UNIVERSAL CASTER & FOUNDRY COMPANY, OF NEW YORK, N. Y., A CORPORATION OF NEW JERSEY.

CASTER FOR FURNITURE.

1,180,830.      Specification of Letters Patent.    Patented Apr. 25, 1916.

Application filed December 31, 1914. Serial No. 879,880.

*To all whom it may concern:*

Be it known that I, ALBERT B. DISS, a citizen and resident of Newark, New Jersey, manufacturer, (whose post-office address is care of Universal Caster & Foundry Company, at Newark, New Jersey,) have invented certain new and useful Improvements in Casters for Furniture, of which the following is a description.

The principal object of the invention is to produce an improved construction of caster, comprising friction reducing roller bearings. It is equally applicable to many different forms of casters but is described and shown herein in the more specific embodiment for detachable casters having a pintle with an enlarged head coöperating with a socket.

The invention combines the economy of material and labor and therefore manufacturing cheapness with excellence in operation. It also affords protection for the friction reducing members, keeping out dust and dirt and preventing interference from foreign bodies.

Figure 1, is an outside view of portions of a caster embodying the present invention. Fig. 2 is a plan view of the same, partly broken away, to show the interior of the construction. Fig. 3 shows a section along the lines 3—3 of Fig. 2.

By the term "caster" unless the context shows a more specific meaning, I shall refer in general to the whole caster structure including stationary and movable parts; and I have illustrated a form in which parts, such as the socket plate for instance, though free to turn does not do so because the friction reducing members allow the jaws to turn relatively with greater freedom, for the one has rolling and the other sliding bearing surfaces.

In the drawings 5 is the caster wheel, 6 the jaws thereof, 7 the pintle securely fastened to the jaws in an appropriate manner, and 8 the socket adapted to coöperate with the pintle and its enlarged head portion in securing the caster in a now well known manner. The sliding surface 9 and the serrated periphery 10 of the socket plate are of course designed for their respective well known purposes.

The leg supporting plate 11 is the upper tracker plate for the bearing in the form of the invention shown. The upper side 12 of the caster jaws or horn 7 forms the lower tracker plate for the bearing.

The plate 11 is provided with an annular corrugation 13 forming a bearing for the rollers 14. These rollers roll between the bearing 13 and a corresponding bearing surface on the lower tracker 12. Concentric with the bearing 13 is the corrugation 16 which with a similar corrugation in the lower tracker 12 gives greater clearance for the headed portions 15 of the rollers. Corrugations 13 and 16 thus comprise annular downwardly projecting bearing surfaces, separated by an annular groove, the construction of the lower tracker being similar. The roller 14 and its headed portion 15 are of one piece construction. It is to be noted that the headed portions 15 of the rollers, and the inner portions of reduced diameter have rolling contact with surfaces 16 and 13, shaped to fit the same, and that the diameters of the two portions of the rollers are so chosen, with relation to the lengths of the circular paths traveled by each, that the rollers will have no tendency to get out of their radial positions, which would otherwise be caused by the fact that the inner portions of the rollers travel in a smaller circle than the outer, or headed portions, 15.

It will, of course, be understood that in referring to the tracker plates, I do not mean to imply that the tracker surfaces must be in one piece with the jaws and leg supporting plate, neither is it necessary that the weight of the leg should rest upon the plate 11 at all. Well known constructions permit the carrying of the weight upon the head of the pintle if desired, though this is objectionable.

In the present invention, the upper tracker plate 11 has a downturned flange which houses and protects the otherwise exposed ends of the rollers 14 and prevents endwise movement of the rollers radially from the pintle.

The rollers 14 are located and spaced peripherally by the spacer plate 17. The latter has cut-out portions conforming in shape to the rollers as is shown in Fig. 3.

Without limiting myself other than is implied by law, I claim as follows:

1. In a caster structure, the combination of a caster-wheel, jaws therefor having a tracker surface upon the horizontal connecting plate thereof, a pintle and socket, a leg supporting plate constituting an upper roller bearing plate, rollers between said leg-supporting plate and tracker surface, radially disposed, with enlarged cylindrical heads at their outer ends, and means for holding said rollers in position, said tracker surface and leg-supporting plate having concentric annular corrugations forming bearing surfaces for the inner and outer portions of the rollers, the diameters of the inner and outer portions of the rollers being so chosen, with relation to the lengths of the paths traveled by said portions, that the rollers will have no tendency to turn out of their radial positions.

2. In a caster structure, the combination of a caster wheel, jaws, radially arranged rollers of cylindrical shape, having outer portions of greater diameter than the inner portions, an upper roller bearing plate, a lower roller bearing plate, and a spacer for the rollers beneath the said upper bearing plate, the said roller bearing plates each having a pair of annular corrugations separated by a groove, said corrugations constituting annular bearing surfaces for the inner and outer portions of the rollers, the two diameters of each roller being so chosen, with relation to the lengths of the paths traveled by said two portions, that the rollers will have no tendency to turn out of their radial positions, said upper roller bearing plate having means for holding the rollers against outward radial displacement.

In testimony whereof I have signed this specification in the presence of two subscribing witnesses.

ALBERT B. DISS.

Witnesses:
E. P. LA GAY,
JOHN HERR.

Copies of this patent may be obtained for five cents each, by addressing the "Commissioner of Patents, Washington, D. C."